(12) United States Patent
Noh

(10) Patent No.: US 11,433,790 B2
(45) Date of Patent: Sep. 6, 2022

(54) AIR DUCT FOR VENTILATION SEAT AND VENTILATION SEAT HAVING SAME FOR VEHICLE

(71) Applicant: YOUNGMIN HIGHTECH CO., LTD., Asan (KR)

(72) Inventor: Ki-Yeong Noh, Asan (KR)

(\*) Notice: Subject to any disclaimer, the term of this patent is extended or adjusted under 35 U.S.C. 154(b) by 294 days.

(21) Appl. No.: 16/499,409

(22) PCT Filed: Jan. 30, 2019

(86) PCT No.: PCT/KR2019/001275
§ 371 (c)(1),
(2) Date: Sep. 30, 2019

(87) PCT Pub. No.: WO2019/212124
PCT Pub. Date: Nov. 7, 2019

(65) Prior Publication Data
US 2021/0402899 A1    Dec. 30, 2021

(30) Foreign Application Priority Data

Apr. 30, 2018  (KR) .................. 10-2018-0049911
Apr. 30, 2018  (KR) .................. 10-2018-0049912

(51) Int. Cl.
*B60N 2/56* (2006.01)
(52) U.S. Cl.
CPC ................... *B60N 2/5657* (2013.01)
(58) Field of Classification Search
CPC ................ B60N 2/5657; B60N 2/5642
See application file for complete search history.

(56) References Cited

U.S. PATENT DOCUMENTS

| | | | |
|---|---|---|---|
| 5,626,382 A * | 5/1997 | Johnson | B29C 45/14795 296/146.7 |
| 6,179,706 B1 * | 1/2001 | Yoshinori | B60N 2/5635 297/180.14 |
| 6,291,803 B1 * | 9/2001 | Fourrey | B60N 2/58 219/202 |
| 6,929,322 B2 * | 8/2005 | Aoki | B60H 1/00285 297/180.13 |

(Continued)

FOREIGN PATENT DOCUMENTS

| EP | 3006262 A1 | 4/2016 |
|---|---|---|
| KR | 10-0905352 B1 | 1/2008 |

(Continued)

OTHER PUBLICATIONS

International Search Report for PCT/KR2019/001275 dated May 15, 2019.

*Primary Examiner* — Shin H Kim

(57) ABSTRACT

The present invention includes: an upper surface provided with a plurality of air outlets; a lower surface provided with an air inlet, and configured such that corners thereof are attached to corners of the upper surface to form an air passage; and a spacer provided on at least one of the lower surface and the upper surface to extend toward the other surface. According to the present invention, it is possible to uniformly discharge incoming air to a seat of a vehicle and to minimize the discomfort experienced by a vehicle occupant, thereby providing a comfortable ride.

19 Claims, 13 Drawing Sheets

(56) References Cited

U.S. PATENT DOCUMENTS

| | | | | |
|---|---|---|---|---|
| 7,013,653 B2* | 3/2006 | Kamiya | B60N 2/5635 | 62/244 |
| 8,757,726 B2* | 6/2014 | Oota | B60N 2/5657 | 297/452.42 |
| 9,055,820 B2* | 6/2015 | Axakov | A47C 7/744 | |
| 10,046,683 B2* | 8/2018 | Line | B60N 2/504 | |
| 10,272,806 B2* | 4/2019 | Bauer | B60N 2/5642 | |
| 10,406,950 B2* | 9/2019 | Yang | B60N 2/5642 | |
| 10,493,879 B2* | 12/2019 | Zimmann | B60N 2/7017 | |
| 10,946,778 B2* | 3/2021 | Frank | B60N 2/70 | |
| 11,091,072 B2* | 8/2021 | Greenwood | B60N 2/7094 | |
| 2005/0264086 A1* | 12/2005 | Lofy | B60N 2/5628 | 297/452.42 |
| 2007/0035162 A1* | 2/2007 | Bier | B60H 1/00285 | 297/180.15 |
| 2009/0033130 A1* | 2/2009 | Marquette | B60N 2/5657 | 297/180.15 |
| 2011/0109128 A1* | 5/2011 | Axakov | A47C 21/044 | 297/180.1 |
| 2011/0260509 A1* | 10/2011 | Siu | B60N 2/5635 | 297/180.14 |
| 2015/0008716 A1* | 1/2015 | Dry | B60N 2/68 | 297/452.18 |
| 2015/0079892 A1* | 3/2015 | Bauer | B60N 2/5642 | 454/120 |
| 2016/0114709 A1* | 4/2016 | Kim | B60N 2/5628 | 454/120 |
| 2016/0144754 A1* | 5/2016 | Bauer | B60N 2/565 | 297/452.47 |
| 2018/0022252 A1* | 1/2018 | Arata | B60N 2/5642 | 297/452.42 |
| 2018/0056834 A1* | 3/2018 | Line | B60N 2/62 | |
| 2018/0065524 A1 | 3/2018 | Bauer et al. | | |
| 2020/0269736 A1* | 8/2020 | Sieting | B60N 2/5642 | |
| 2021/0300218 A1* | 9/2021 | Greenwood | B60N 2/5642 | |

FOREIGN PATENT DOCUMENTS

| | | |
|---|---|---|
| KR | 10-1180702 B1 | 9/2012 |
| KR | 10-1244881 B1 | 3/2013 |
| KR | 10-1280775 B1 | 5/2013 |
| KR | 10-1549826 B1 | 9/2015 |
| KR | 10-2016-0050131 A | 5/2016 |
| KR | 10-2016-0062237 A | 6/2016 |
| KR | 10-2016-0083213 A | 7/2016 |
| KR | 10-2016-0136858 A | 11/2016 |

* cited by examiner

AIR DUCT FOR VENTILATION SEAT AND VENTILATION SEAT HAVING SAME FOR VEHICLE

CROSS REFERENCE TO RELATED APPLICATIONS

This application claims priority to Korean Patent Application Nos. 10-2018-0049911, filed on Apr. 30, 2018, and 10-2018-0049912, filed on Apr. 30, 2018. Further, the application is the National Phase application of International Application No. PCT/KR2019/001275, filed on Jan. 30, 2019, which designates the United States. Each of these applications is hereby incorporated by reference in their entirety into the present application.

TECHNICAL FIELD

The present invention relates generally to an air duct for a ventilation seat and a ventilation seat having the same for a vehicle. More particularly, the present invention relates to an air duct for a ventilation seat and a ventilation seat having the same for a vehicle, in which an air flow structure is improved and it is possible to provide a comfortable seating feel to a user.

BACKGROUND ART

An air conditioning apparatus is used to keep the temperature, the humidity, the air cleanliness, and the air flow of a space pleasant, and particularly, the importance of the air conditioning apparatus becomes more prominent in an enclosed space such as a vehicle.

In general, an air conditioning apparatus applied to a vehicle is provided with a cooling and heating device composed of an air conditioner and a heater to provide air on the front and side of the inside of the vehicle, but a vehicle seat, with which an occupant's body is brought directly into contact, is not provided with the air from the cooling and heating device described above, which is a factor that reduces ride comfort of the occupant.

Conventionally, as disclosed in Korean Patent No. 10-1280775, by using a seat configured such that outside air is sucked and the air is discharged through an air discharge hole formed in the seat via an air transfer hole having a predetermined shape, it is possible to provide comfortable ride and to reduce unnecessary energy consumption by directly transmitting the cooling effect to an occupant.

However, the ventilation seat configured as described above is problematic in that the air transfer hole for guiding air and a fan for sucking air are generally inserted into the seat, which causes discomfort to the occupant when the occupant sits on the seat, so the ride comfort is deteriorated. Further, when the air transfer hole for guiding air is made of a material such as memory foam that absorbs an external force while maintaining a predetermined shape in order to improve the ride comfort, the space defined in the air transfer hole is blocked when an occupant sits on the seat and an external force is applied to the seat, so air may not be smoothly transported.

Further, in Korean Patent Application Publication No. 2016-0062237, there has been disclosed a seat including a mesh that is inserted into back and front surfaces of vent holes to fill the vent holes, which are formed in a back pad structure in the forward and backward directions. However, the mesh is problematic in that an air passage may be clogged by the occupant's weight at the time of sitting, and the size of a blower must be larger in order to increase the efficiency.

Further, the conventional ventilation seat is problematic in that when an external force is applied to the seat by an occupant, the sucked air leaks into a fine gap formed on the seat of the vehicle, so noise may be generated due to the fan under load.

DOCUMENTS OF RELATED ART

Patent Document

1. Korean Patent No. 10-1280775 (registered Jun. 25, 2013)
2. Korean Patent Application Publication No. 2016-0062237 (published Jun. 2, 2016)

DISCLOSURE

Technical Problem

Accordingly, the present invention has been made keeping in mind the above problems occurring in the related art, and an object of the present invention is to provide an air duct for a ventilation seat and a ventilation seat having the same for a vehicle, in which it is possible to uniformly discharge sucked air to a seat of a vehicle and to minimize the discomfort experienced by a vehicle occupant, thereby providing a comfortable ride.

Further, another object of the present invention is to provide an air duct for a ventilation seat and a ventilation seat having the same for a vehicle, in which it is possible to minimize an external force transmitted to a panel provided in a vehicle seat to guide the flow of air, thereby facilitating the air flow and reducing noise.

Technical Solution

In order to achieve the above object, the present invention provides an air duct for a ventilation seat, the air duct including: an upper surface provided with a plurality of air outlets; a lower surface provided with an air inlet, and configured such that corners thereof are attached to corners of the upper surface to form an air passage; and a spacer provided on at least one of the lower surface and the upper surface to extend toward the other surface.

Preferably, the spacer is configured such that protrusions are provided on at least one of the lower surface and the upper surface to extend toward the other surface at predetermined intervals.

Preferably, the upper surface is configured such that a gentle conical protruding portion is provided on an inner surface thereof facing the air inlet so as to diffuse incoming air to ends of the corners; and the lower surface is fastened by using a fastener to a conveying duct for conveying air from a fan, and includes a locking piece provided to intersect in a U shape with the fastener fastening the conveying duct.

Preferably, the upper surface or the lower surface includes a wrinkle portion to be bent at a predetermined angle at a time of sitting. Further, a nonwoven fabric may be attached to a bottom of the lower surface.

Preferably, the upper surface is configured such that a spiral protrusion is provided on an inner side of each of the air outlets.

Preferably, the air duct constituted by the upper surface and the lower surface is provided with a fan and a conveying duct at a side thereof; and the upper surface or the lower surface includes a bent portion that partitions a flow direction of incoming air and guides air flow. The upper surface or the lower surface may include a first bent portion configured to be bent at a predetermined angle at a time of sitting while partitioning a flow direction of incoming air into at least one of a central portion, a left side, and a right side, and the first bent portion may be configured such that an end thereof is gently curved toward an air inlet side.

Preferably, the upper surface or the lower surface includes a second bent portion configured to be bent in a direction perpendicular to a flow direction of air flowing in the air duct. The second bent portion may include: an upper convex portion configured such that an upper inner surface of the air duct corresponding to a seat bottom of the upper surface is convex downwardly; and a lower convex portion configured such that an inner surface of the lower surface diagonally facing the upper convex portion is convex upwardly, wherein the upper convex portion and the lower convex portion are spaced apart from each other at a predetermined interval.

Preferably, the air duct of includes: a lower chamber of hard material configured such that the upper surface is provided with a discharge hole, the lower surface is provided with an air inlet, and the corners of the upper surface and the lower surface are attached together to form a chamber-type air passage; and an adapter of soft material provided with a plurality of air outlets connected with the discharge hole of the lower chamber to be connected to a discharge passage of a foam pad.

Preferably, a chamber constituted by the upper surface and the lower surface is configured such that a width thereof is gradually increased from an air inlet side toward an inside of the chamber and then is constant.

Preferably, a ventilation seat is configured in a form of a seat back part or a seat bottom part, the ventilation seat including: the upper surface provided with the plurality of air outlets; the lower surface provided with the air inlet, and configured such that the corners thereof are attached to the corners of the upper surface to form the air passage; the spacer provided on at least one of the lower surface and the upper surface to extend toward the other surface; a cushion part connected to the air outlets of the upper surface and an air passage of the foam pad; and a support means supporting the lower surface.

Advantageous Effects

According to the present invention, it is possible to uniformly discharge sucked air to the seat of the vehicle and to minimize the discomfort experienced by a vehicle occupant, thereby providing a comfortable ride.

BEST MODE

Figure 1:
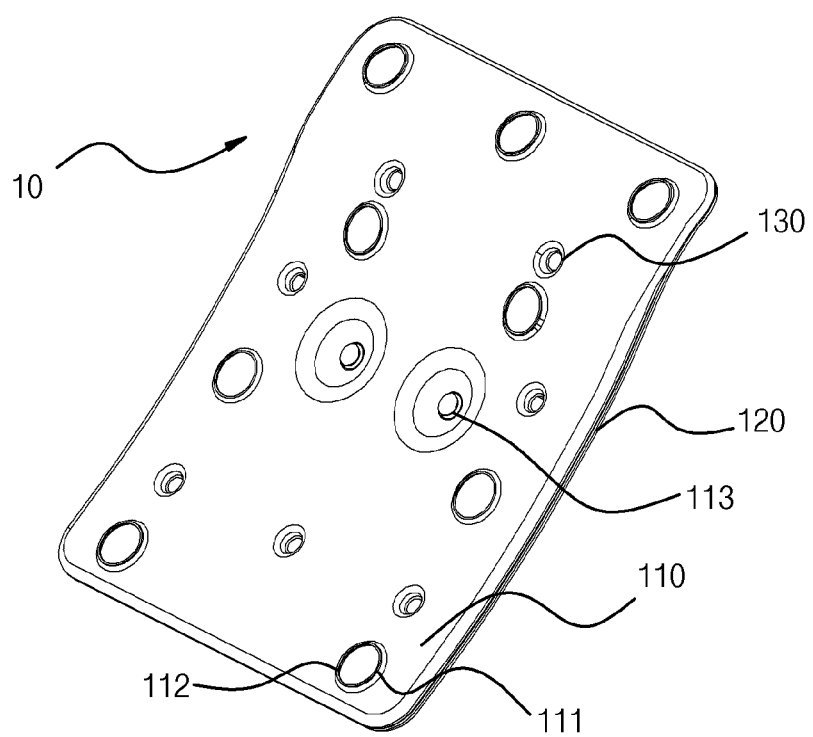
FIG. 1 is a perspective view showing an upper surface of an air duct for a ventilation seat according to a first embodiment of the present invention.

Hereinbelow, the present invention will be described in detail with reference to the accompanying drawings. Wherever possible, the same reference numerals will be used throughout the drawings and the description to refer to the same or like elements or parts. Further, it is to be noted that, when the functions of conventional elements and the detailed description of elements related with the present invention may make the gist of the present invention unclear, a detailed description of those elements will be omitted.

Figure 2:
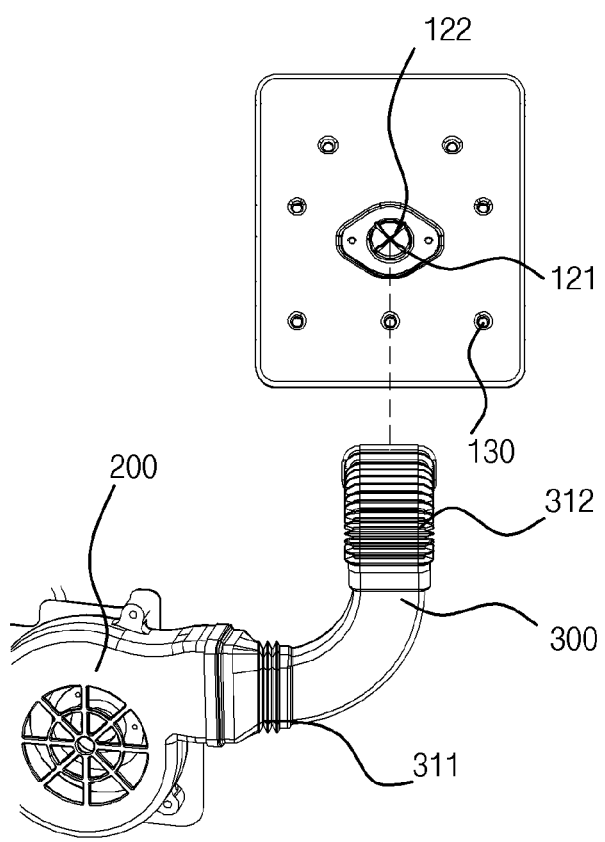
FIG. 2 is an exemplary view showing a lower surface of the air duct for a ventilation seat according to the first embodiment of the present invention.

FIG. 1 is a perspective view showing an upper surface of an air duct for a ventilation seat according to a first embodiment of the present invention, and FIG. 2 is an exemplary view showing a lower surface of the air duct for a ventilation seat according to the first embodiment of the present invention. As shown in FIGS. 1 and 2, an air duct 10 for a ventilation seat according to the embodiment has a chamber-type structure including an upper surface 110, a lower surface 120, and a spacer 130.

The upper surface 110 is formed with a plurality of air outlets 111. The lower surface 120 is formed with an air inlet, and corners thereof are attached to corners of the upper surface to form a chamber-type air passage. The spacer 130 is formed on at least one surface of the lower surface and the upper surface toward the other surface.

Figure 11:
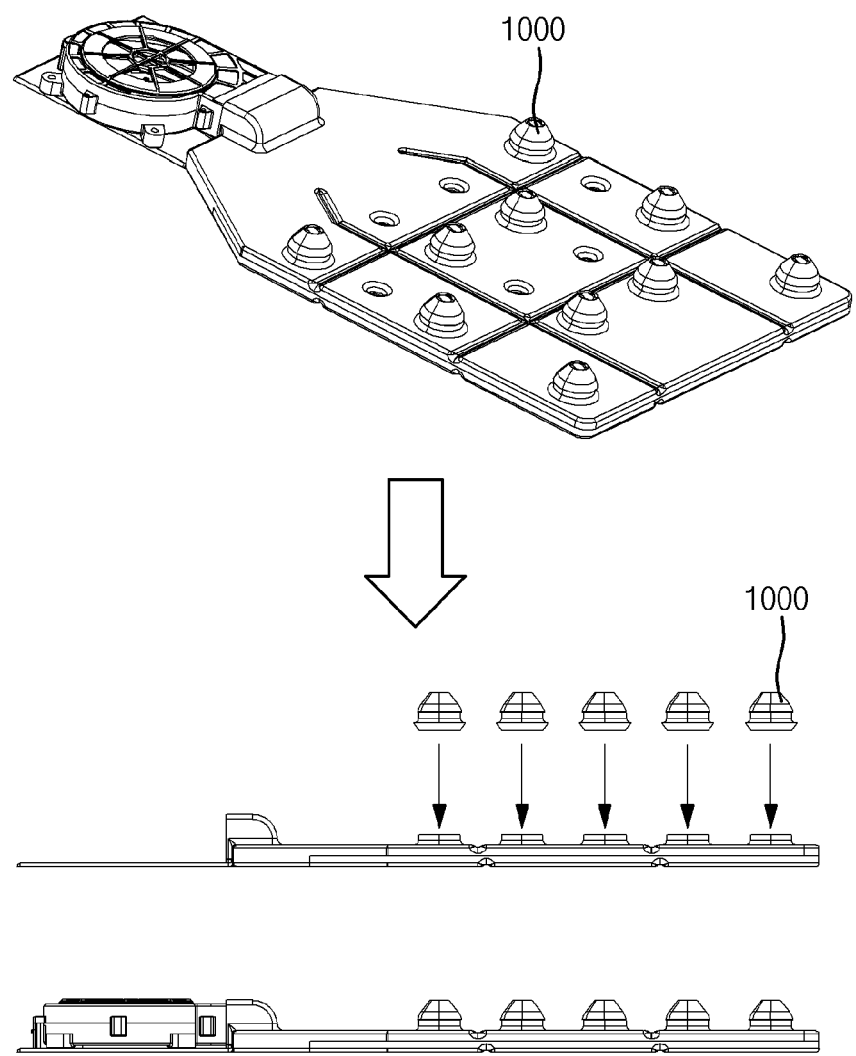
FIG. 11 is an exemplary view showing a cap 1000 of the air duct for a ventilation seat according to an embodiment of the present invention.
Figure 12:
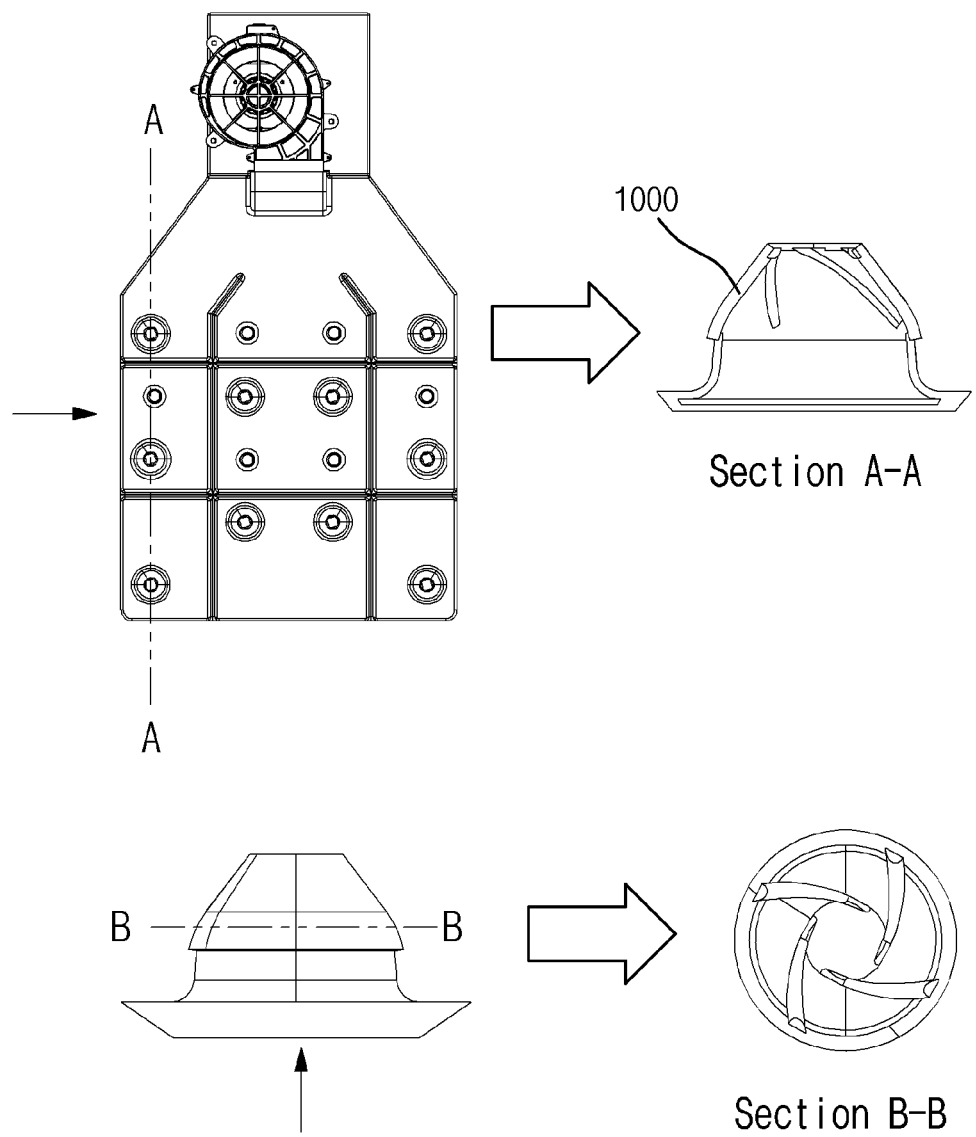
FIG. 12 is an exemplary view showing a cross-section of the cap 1000 of the air duct for a ventilation seat according to an embodiment of the present invention.

A spiral protrusion 112 is formed on an inner side of the air outlet 111 so as to form a vortex in a discharge passage of a foam pad when the air outlet 111 of the upper surface 110 is coupled to the foam pad of a seat cushion part of the vehicle. With this structure, the discharged air is discharged in a vortex form to increase the strength and pressure of the air flow. Meanwhile, FIG. 11 is an exemplary view showing a cap 1000 of the air duct for a ventilation seat according to an embodiment of the present invention, and FIG. 12 is an exemplary view showing a cross-section of the cap 1000 of the air duct for a ventilation seat according to an embodiment of the present invention. As shown in FIGS. 11 and 12, the air outlet 111 of the air duct may be provided with a cylindrical cap 1000 on the outer surface thereof to be engaged with the discharge passage of the foam pad, wherein the cap 1000 is formed on the inner side thereof with a threaded protrusion to form a vortex.

As shown in FIG. 1, the upper surface may be provided with a clamping portion 113 so as to be clamped to clamping means provided on opposite sides of a fastener 121 of the lower surface of FIG. 2. Accordingly, the space between the upper surface and the lower surface can be stably formed, and stable fixing is possible even when the air duct is fastened to a conveying duct 300.

Further, as shown in FIGS. 1 and 2, the spacer 130 of the air duct 10 for a ventilation seat can prevent clogging of the air passage due to the weight of an occupant by forming a plurality of protrusions at predetermined intervals on the inner surface of the corresponding position where the human body is brought in contact at the time of sitting. The air outlet 111 may be variously designed according to the position of the air passage of the foam pad according to the type of vehicle.

The air duct 10 for a ventilation seat according to the embodiment is configured such that a gentle conical protruding portion (not shown) is provided on the inner side of the upper surface, which is the inner side of the air duct for a ventilation seat facing the air inlet of the lower surface, thereby diffusing the incoming air to the inner corners of the air duct for a ventilation seat. As shown in FIG. 1, the bending of one end of the air duct 10 for a ventilation seat may be changed according to the shape of the foam pad.

As shown in FIG. 2, the air duct for a ventilation seat is fastened to a conveying duct 300 for conveying air from a fan 200. Herein, the air duct 10 for a ventilation seat includes a locking piece 122 formed at the bottom thereof to intersect with the fastener 121 fastened to the conveying duct 300 in a U shape. Due to the configuration of the locking piece 122 formed to intersect in the U shape, the air duct can be fastened by the weight of the foam pad and the seat placed on the upper portion of the air duct without a fastening means, and it is possible to prevent separation due to the vibration of the fan or conveying duct. Further, the conveying duct 300 is provided with an elastic member 310 that includes a first elastic member 311 connected to the fan 200 and a second elastic member 312 connected to the lower surface of the air duct, thereby reducing the vibration transmitted from the fan 200.

Figure 3:
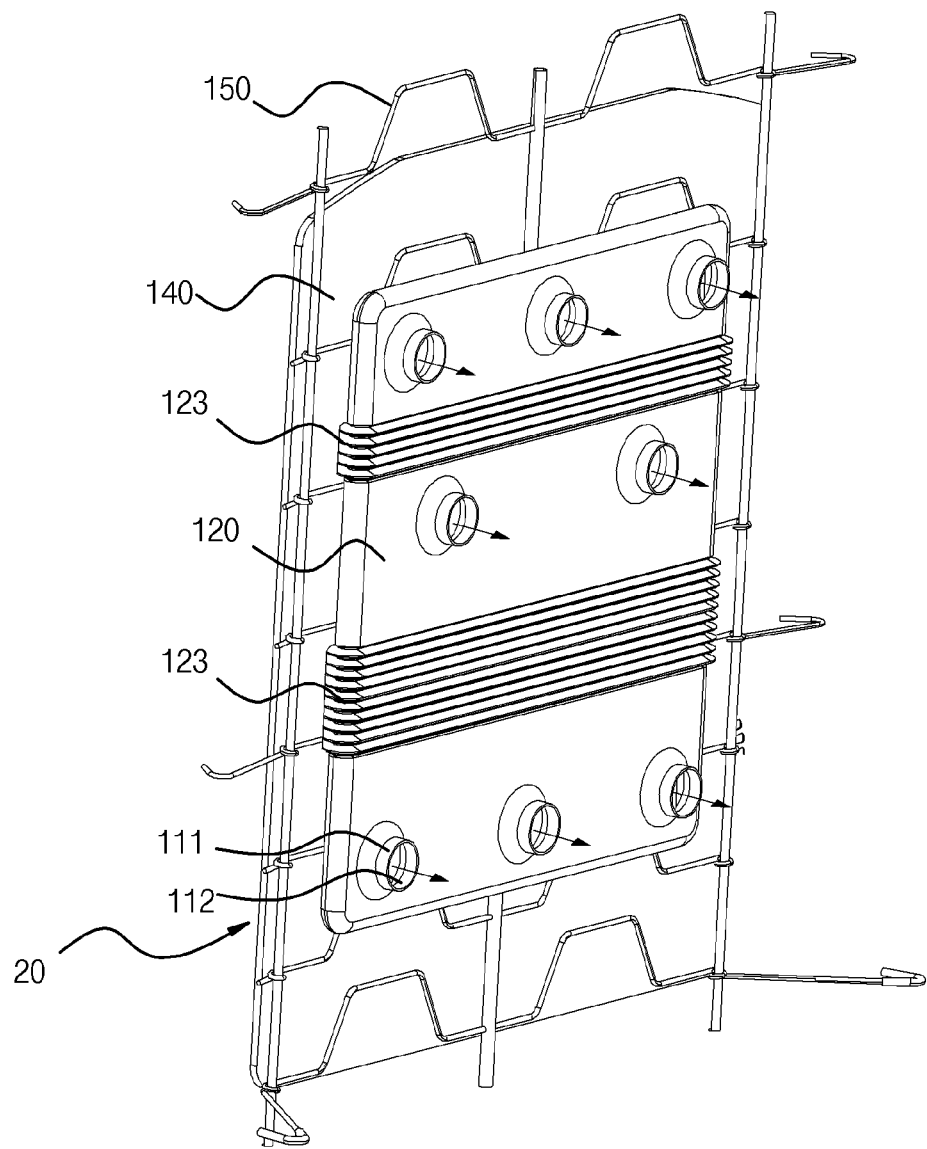
FIG. 3 is an exemplary view showing a shape of a seat back part 20 of an air duct for a ventilation seat according to a second embodiment of the present invention.

FIG. 3 is an exemplary view showing a shape of a seat back part 20 of an air duct for a ventilation seat according to a second embodiment of the present invention. As shown in FIG. 3, the air duct may include a wrinkle portion 123 configured such that wrinkles are formed on one surface of an upper surface and a lower surface in a horizontal direction so as to be bent at a predetermined angle at the time of sitting against the seat back part.

Further, a nonwoven fabric 140 may be attached to the lower surface of the air duct 120 for a ventilation seat to reduce vibration of the fan or the conveying duct. Further, a support means 150 may be provided to support the external force transmitted by the occupant's weight, and preferably, the support means 150 is formed in a shape that is bent at least once so as to disperse and support the transmitted external force. Further, as shown in FIG. 2, the conveying duct 300 may be provided with at least one elastic member 310 to absorb the external force applied thereto.

When the air duct 120 for a ventilation seat is applied to a vehicle seat, the spiral protrusion 112 is formed on the inner side of the air outlet 111 so as to form a vortex in the discharge passage of the foam pad when the air outlet 111 of the upper surface 110 is coupled to the foam pad of the seat cushion part of the vehicle. The air outlet 111 of the air duct may be provided with the spiral cap 1000 shown in FIGS. 11 and 12 to form a vortex. With this structure, the discharged air is discharged in a vortex form to increase the strength and pressure of the air flow.

Figure 4:
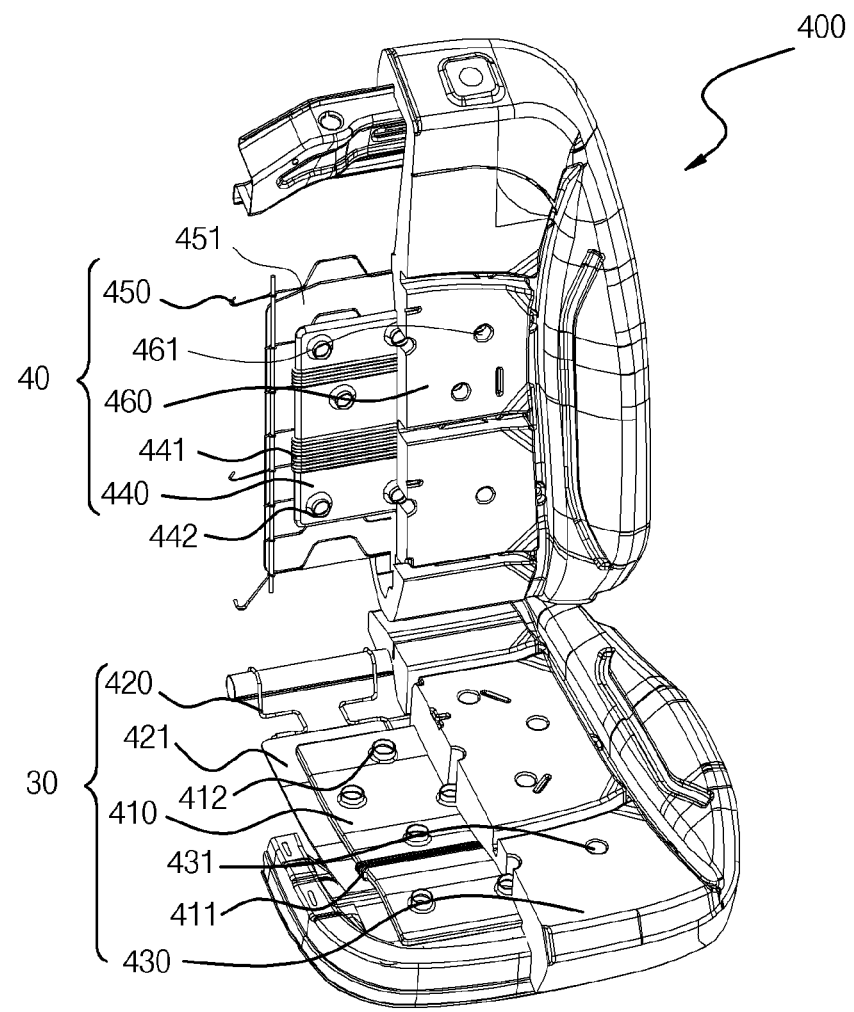
FIG. 4 is an inside perspective view showing a seat back part and a seat bottom part of a ventilation seat for a vehicle having the air duct according to the first embodiment and the second embodiment of the present invention.
Figure 5:
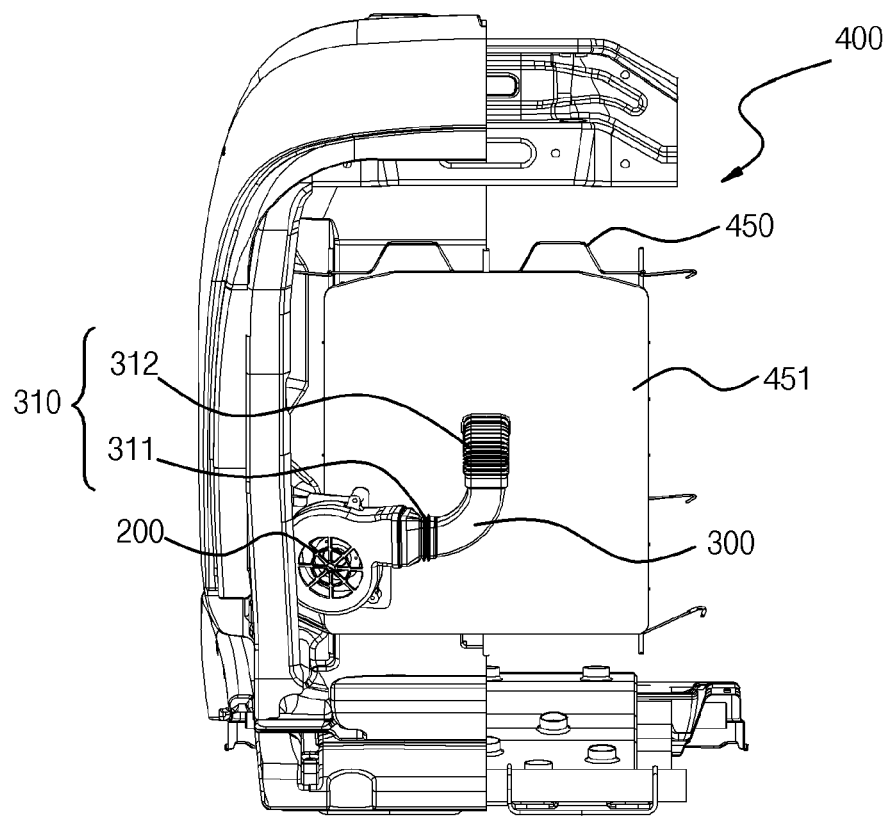
FIG. 5 is an exemplary view showing a rear side of the ventilation seat for a vehicle having the air duct according to the first embodiment and the second embodiment of the present invention.
Figure 6:
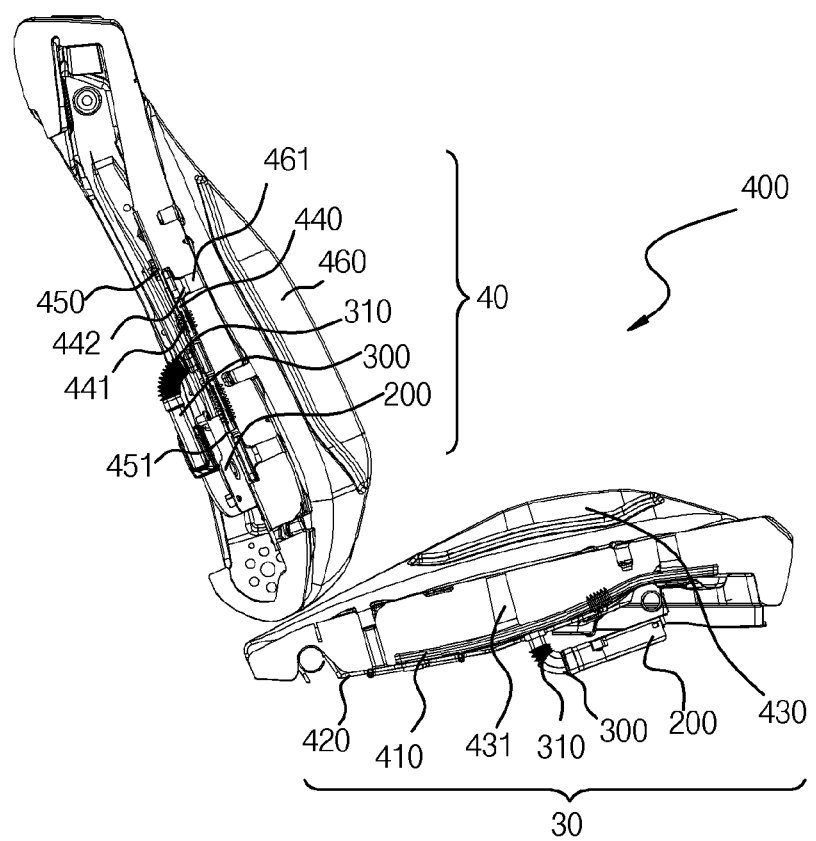
FIG. 6 is an exemplary view showing a cross-section of the ventilation seat for a vehicle having the air duct according to the first embodiment and the second embodiment of the present invention.

FIG. 4 is an inside perspective view showing a seat back part and a seat bottom part of a ventilation seat for a vehicle having the air duct according to the first embodiment and the second embodiment of the present invention, FIG. 5 is an exemplary view showing a rear side of the ventilation seat for a vehicle having the air duct according to the first embodiment and the second embodiment of the present invention, and FIG. 6 is an exemplary view showing a cross-section of the ventilation seat for a vehicle having the air duct according to the first embodiment and the second embodiment of the present invention.

As shown in FIG. 4, a seat bottom part 30 of a ventilation seat 400 for a vehicle having an air duct for a ventilation seat includes an air duct 410 for a ventilation seat, a support means 420, and a cushion part 430.

The air duct 410 for a ventilation seat according to the embodiment is provided with a wrinkle portion 411 at a position corresponding to the buttocks portion at the time of sitting so as to be bent at the time of sitting. The support means 420 is provided to support the bottom of the air duct 410 for a ventilation seat, and the support means 420 includes a nonwoven fabric 421 attached to the bottom of the air duct 410 for a ventilation seat to reduce vibration transmitted from the fan or the conveying duct. Further, the cushion part 430 is configured such that an air passage thereof is connected to the air outlet 412 of the air duct 410 for a ventilation seat to discharge air through a ventilation seat hole 431.

Further, a seat back part 40 of the ventilation seat 400 for a vehicle having an air duct for a ventilation seat includes an air duct 440 for a ventilation seat, a support means 450, and a cushion part 460. The air duct 440 for a ventilation seat is formed in the shape of the seat back part 40, and a wrinkle portion 441 is provided at a position corresponding to the back of the occupant at the time of sitting to give comfort. Further, the seat back part is provided with the support means 450 for supporting the back side of the air duct 440 for a ventilation seat, and a nonwoven fabric 451 is attached to the rear surface of the support means 450 to reduce vibration transmitted from the fan or the conveying duct. The cushion part 460 is configured such that an air passage thereof is connected to the air outlet 442 of the air duct 440 for a ventilation seat to discharge air through a ventilation seat hole 461. Each of the air outlets 412 and 442 of FIG. 4 may be provided with the spiral protrusion or a structure of a spiral cap on the inner side thereof, as shown in FIGS. 1, 11, and 12.

As shown in FIG. 5, the ventilation seat 400 for a vehicle having an air duct for a ventilation seat may be provided with at least one elastic member 310 at the conveying duct 300 to absorb the external force applied thereto when the fan 200 and the conveying duct 300 are connected with each other. The elastic member 310 includes: the first elastic member 311 formed with wrinkles at a portion of the conveying duct 300 connected to the fan 200 side; and the second elastic member 312 formed with wrinkles at a portion of the conveying duct 300 connected to the air duct side. In addition to the elastic member, the support means 450 and the nonwoven fabric 451 are provided reduce vibration due to seating and vibration transmitted from the fan including the supporting portion and the nonwoven fabric.

As shown in FIG. 6, the fan 200 and the conveying duct 300 may be separately provided and connected to the air ducts of the seat back part 40 and the seat bottom part 30, or may be integrally provided. Although the ventilation seat 400 for a vehicle having the air duct 410 of the seat bottom part 30 and the air duct 440 of the seat back part 40 has been described with reference to the first and second embodiments, it is of course possible to apply an air duct for a ventilation seat of the embodiment described below.

The seat bottom part 30 of FIG. 6 is configured such that the air duct 410, at which the fan 200 and the conveying duct 300 are connected with each other, is supported by the support means 420, vibration is reduced by the elastic member 310 of the conveying duct 300, and the nonwoven fabric is provided between the support means 420 and the air duct 410 to reduce vibration. The air outlet of the air duct 410 is connected with the air passage of the cushion part 430 such that air is discharged through the ventilation seat hole 431. The seat back part 40 has been described above with reference to FIG. 4, and a description thereof will be omitted.

Figure 7:
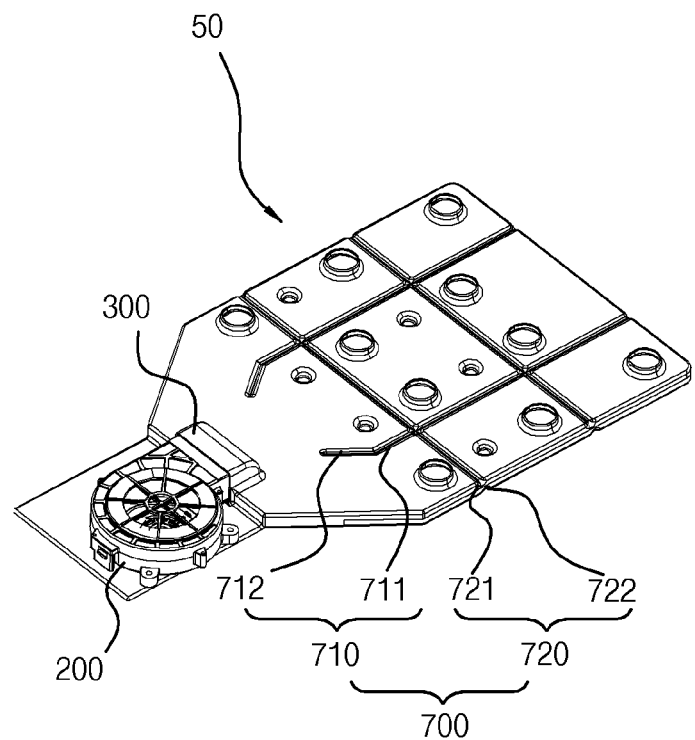
FIG. 7 is an exemplary view showing a shape of an air duct 50 for a ventilation seat according to a third embodiment of the present invention.
Figure 8:
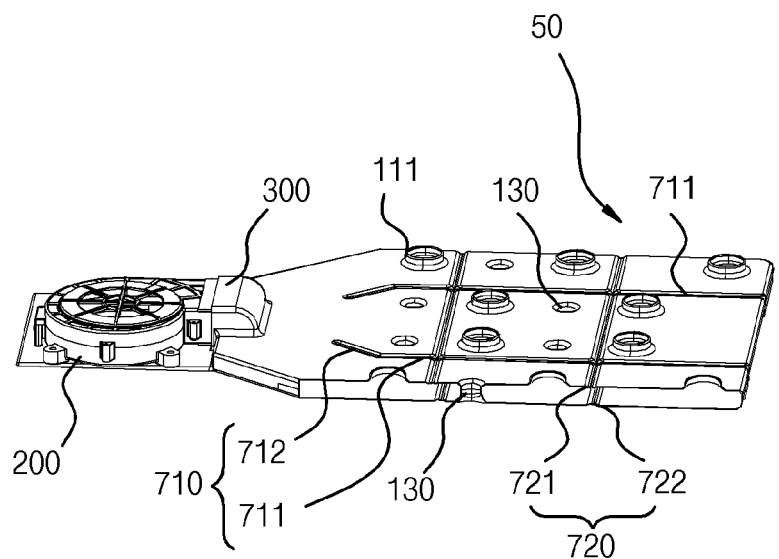
FIG. 8 is a sectional perspective view showing the shape of the air duct 50 for a ventilation seat according to the third embodiment of the present invention.

FIG. 7 is an exemplary view showing a shape of an air duct 50 for a ventilation seat according to a third embodiment of the present invention, and FIG. 8 is a sectional perspective view showing the shape of the air duct 50 for a ventilation seat according to the third embodiment of the present invention. As shown in FIGS. 7 and 8, the fan 200 and the conveying duct 300 may be integrally provided at one side of the air duct 50 for a ventilation seat. Further, the air duct 50 for a ventilation seat includes a bent portion 700 that partitions or induces the flow direction of the incoming air. The bent portion 700 includes: a first bent portion 710 configured to be bent at a predetermined angle at the time of sitting while dividing the flow direction of the air flow into a central portion, a left side, and a right side; and a second bent portion 720 configured to be bent in a vertical direction based on the flow direction of the air flowing in the air duct 50.

The first bent portion 710 is configured to be bent at a predetermined angle at the time of sitting while a partition portion 711 in the form of a partition plate or a protrusion divides the direction of the air flow introduced in the air duct 50 into the central portion, the left side, and the right side. The first bent portion 710 is configured, as shown in FIG. 7, such that an air inlet side end 712 is gently curved so as to induce the direction of the air flow to the central portion, the left side, and the right side. Further, the air duct 50 for a ventilation seat is formed to be gradually wider from the air inlet side toward the inside and then have a predetermined width, and the end of the first bent portion is gently bent along the appearance of the air duct 50 toward the air inlet side to evenly induce the direction of the air flow by dividing the air duct into the central portion, the left side, and the right side.

The second bent portion 720 includes: an upper convex portion 721 configured such that an upper inner surface of the air duct corresponding to the buttocks at the time of sitting is convex downwardly; and a lower convex portion 722 configured such that a lower inner surface of the air duct diagonally facing the upper convex portion 721 is convex upwardly. Due to the second bent portion 720, the air duct 50 for a ventilation seat can form a wavy air passage, and allows the air flow to smoothly flow to the corners of the air duct while being bent by the occupant's weight at the time of sitting.

FIG. 8 is a sectional perspective view showing the shape of the air duct 50 for a ventilation seat according to the third embodiment of the present invention, wherein the spacer 130 is provided in the form of a protrusion on either the upper surface or the lower surface. The protrusion of the spacer 130 may be protrudingly provided on each of the inner upper surface and the inner lower surface of the air duct to be connected to each other, or to be spaced apart from each other. The protrusion of the spacer 130 maintains the air passage inside the chamber-type air duct so that air can be discharged to the air outlet 111. The description of the first bent portion 710 having the partition portion 711 and the air inlet side end 712 of FIG. 8, and the upper convex portion 721 and the lower convex portion 722 of the second bent portion 720 have been made with reference to FIG. 7.

Figure 9:
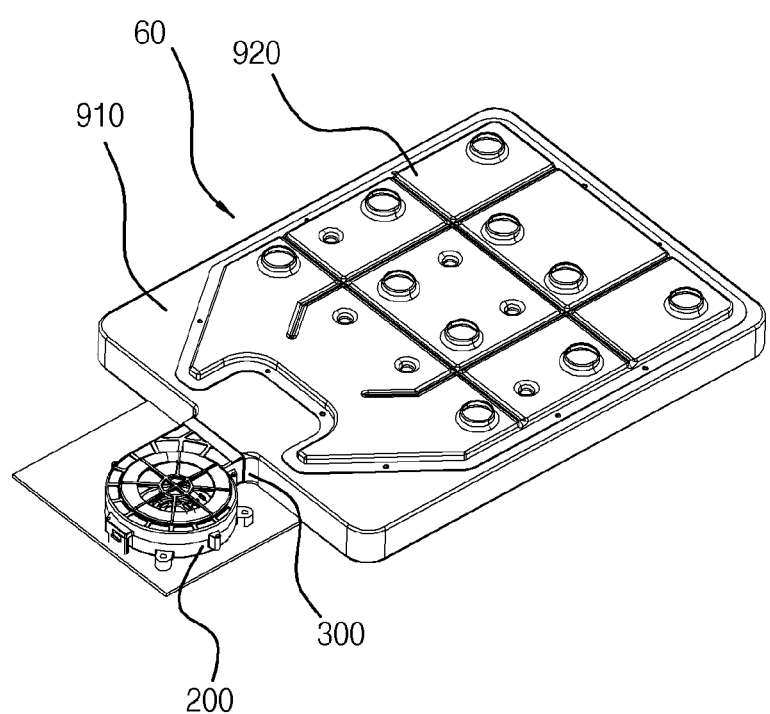
FIG. 9 is a perspective view showing a shape of an air duct 60 for a ventilation seat according to a fourth embodiment of the present invention.
Figure 10:
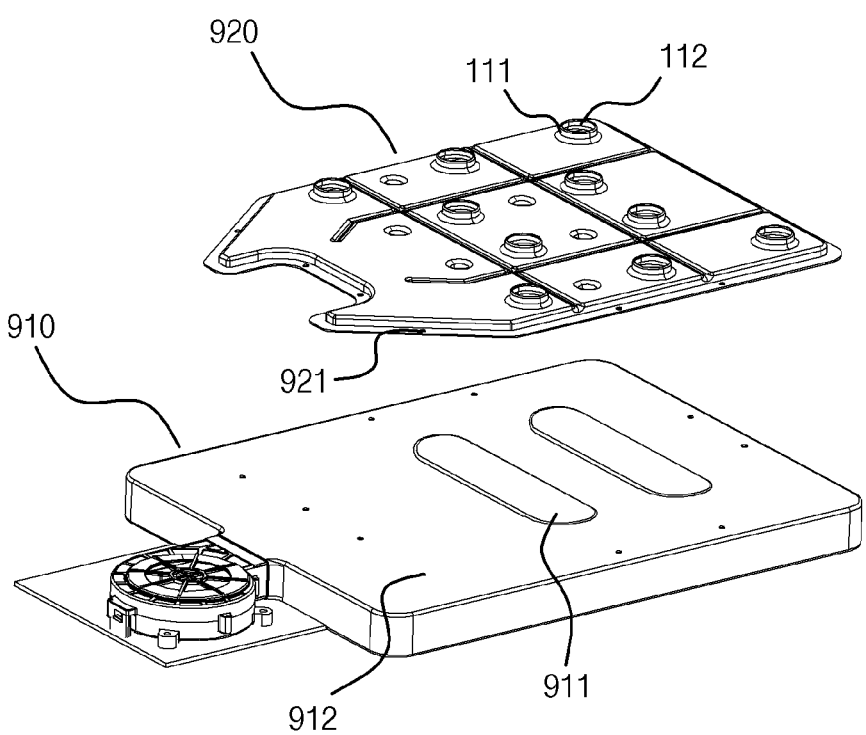
FIG. 10 is an assembly perspective view showing the air duct 60 for a ventilation seat according to the fourth embodiment of the present invention.

FIG. 9 is a perspective view showing a shape of an air duct 60 for a ventilation seat according to a fourth embodiment of the present invention, and FIG. 10 is an assembly perspective view showing the air duct 60 for a ventilation seat according to the fourth embodiment of the present invention. As shown in FIGS. 9 and 10, the air duct 60 for a ventilation seat according to the fourth embodiment includes a lower chamber 910 and an adapter 920.

As shown in FIG. 10, the lower chamber 910 is configured such that the upper surface thereof is formed with a discharge hole 911, and the lower surface thereof is formed with an air inlet through which air is introduced from the fan and the conveying duct. Here, the lower chamber of hard material is configured such that the corners of the upper surface and the lower surface are attached together to form the chamber-type air passage, and the adapter 920 of soft material includes a plurality of air outlets 111 connected with the discharge hole 911 of the lower chamber 910 to be connected to the discharge passage of the foam pad according to the vehicle model. Further, the adapter 920 is provided with the bent portion described in the above embodiment to induce the air flow and to be bent while forming the air passage, thereby giving comfort at the time of sitting. Here, the spacer may be configured such that a protrusion protrudes downwardly from the upper surface of the adapter 920.

The lower chamber 910 and the adapter 920 is configured, as shown in FIG. 10, such that multiple coupling means 912 of the lower chamber 910 and multiple coupling means 921 of the adapter 920 are coupled together to seal the lower chamber and the adapter; and the air has a constant pressure through the discharge hole of the lower chamber in the lower chamber 910 and the adapter 920, and is discharged to the air outlet 111 of the adapter.

Meanwhile, the air duct for a ventilation seat according to an embodiment of the present invention is configured, as shown in FIG. 10, such that the air outlet 111 of the air duct is formed on the inner side thereof with the spiral protrusion 112 so as to form a vortex in the discharge passage of the foam pad when the air outlet 111 is coupled to the foam pad of the cushion part. The spiral cap 1000 may be provided at the adapter or the air outlet of the air to form a vortex. With this structure, the discharged air is discharged in a vortex form to increase the strength and pressure of the air flow.

FIG. 11 is an exemplary view showing the cap 1000 of the air duct for a ventilation seat according to an embodiment of the present invention, and FIG. 12 is an exemplary view showing a cross-section of the cap 1000 of the air duct for a ventilation seat according to an embodiment of the present invention. As shown in FIG. 11, the cap 1000 of the air duct is configured such that a capsule-type second air outlet is inserted in and assembled with the air outlet to maximize wind pressure. As shown in FIG. 12, the cap 1000 is formed with the threaded protrusion that can generate a rotating wind vortex.

Figure 13:
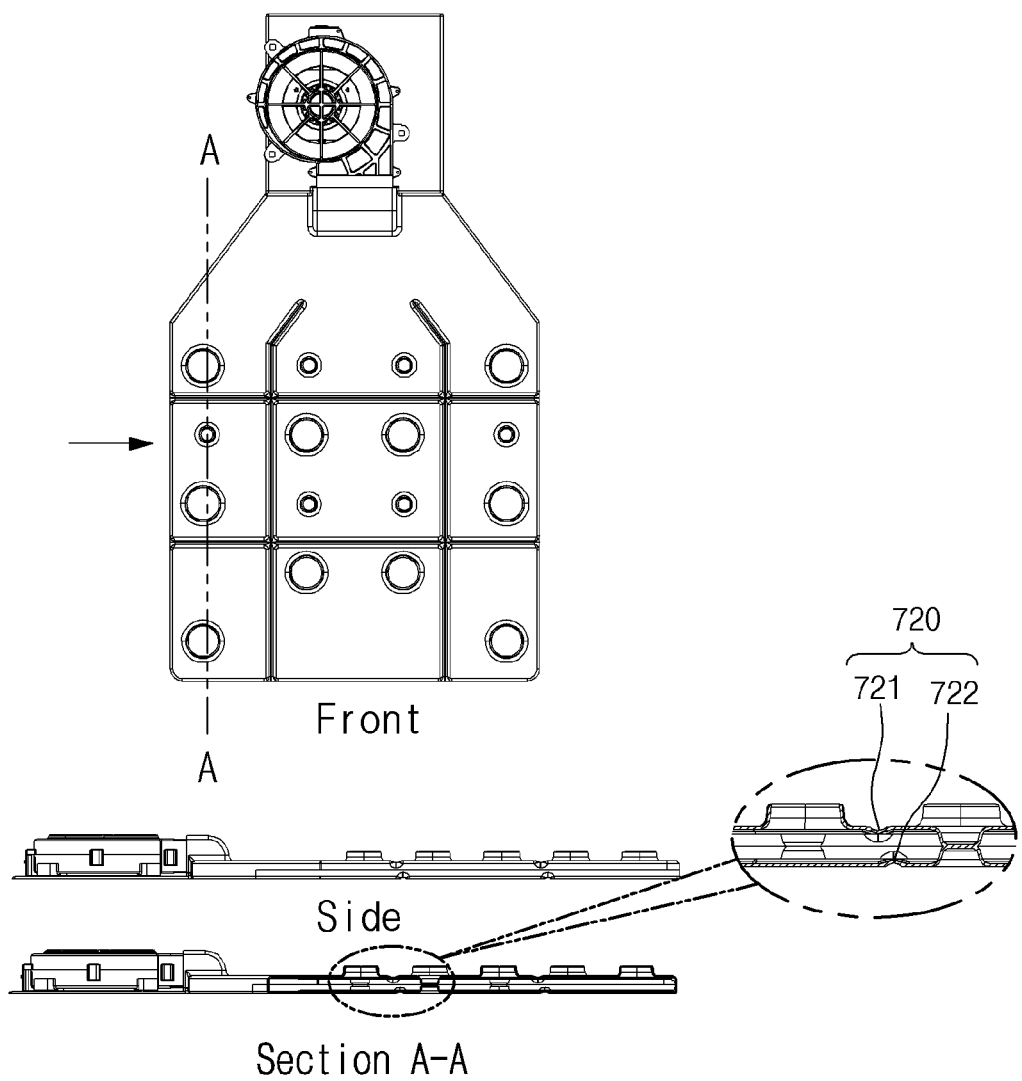
FIG. 13 is an exemplary view further illustrating a second bent portion 720 in the upper surface and the lower surface of the air duct for a ventilation seat according to an embodiment of the present invention.

FIG. 13 is an exemplary view further illustrating a second bent portion 720 in the upper surface and the lower surface of the air duct for a ventilation seat according to an embodiment of the present invention. The second bent portion includes: a bead surface that is the upper convex portion 721 configured such that an upper inner surface of the air duct corresponding to the occupant's buttocks at the time of sitting is convex downwardly; and second bent portion that is the lower convex portion 722 configured such that a lower inner surface of the air duct diagonally facing the upper convex portion 721 is convex upwardly. Due to the second bent portion 720, the air duct 50 for a ventilation seat can form a wavy air passage, and allows the air flow to smoothly flow to the corners of the air duct while being bent by the occupant's weight at the time of sitting. As shown in FIG. 13, convex beads are provided so that the second bent portion can be flexibly bent at the time of sitting. Here, if the upper and lower bead surfaces are configured to face each other at the time of sitting, the upper and lower bead surfaces may interfere with the flow path. However, if the upper and lower bead surfaces are staggered by at least 5 mm, the upper and lower bead surfaces can be flexibly bent without interfering with the flow path.

Figure 14:
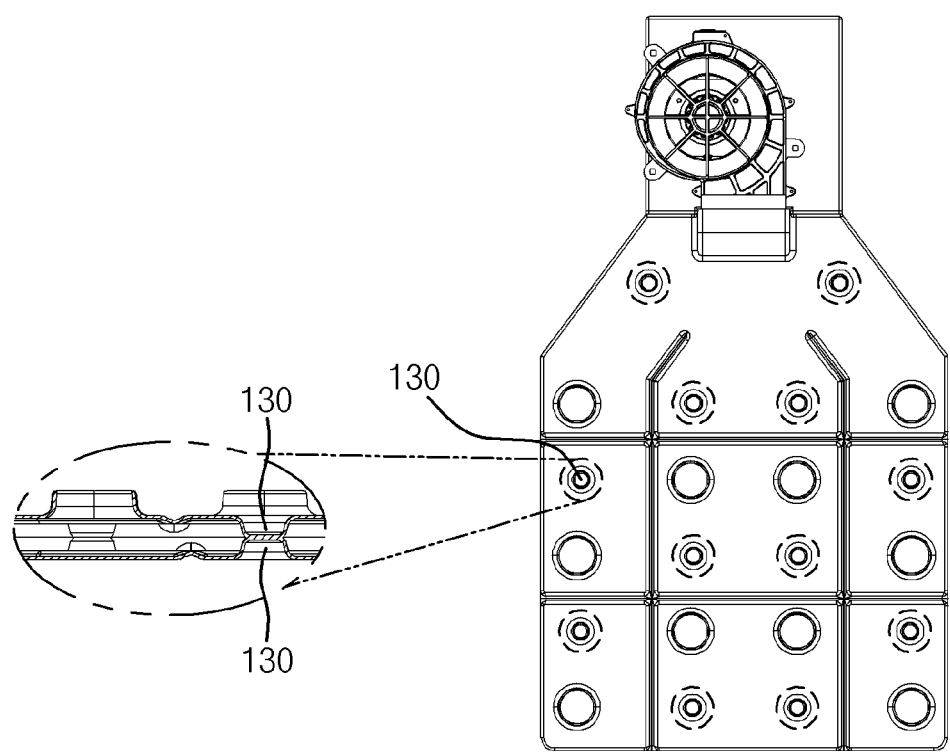
FIG. 14 is an exemplary view showing a cross-section of a spacer of the air duct for a ventilation seat according to an embodiment of the present invention.

FIG. 14 is an exemplary view showing a cross-section of the spacer 130 of the air duct for a ventilation seat according to an embodiment of the present invention. As shown in FIG. 14, the spacer 130 is configured such that the protrusion (boss) functioning as a support is placed in multiple positions to facilitate the formation of the ventilation flow path at the time of seating, which does not affect the flow rate regardless of the positions and the number of protrusions.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. An air duct for a ventilation seat, the air duct comprising:
an upper surface provided with a plurality of air outlets;
a lower surface provided with an air inlet, and configured such that corners thereof are attached to corners of the upper surface to form an air passage; and
a spacer provided on at least one of the lower surface and the upper surface to extend toward the other surface,
wherein the upper surface is configured such that a gentle conical protruding portion is provided on an inner surface thereof facing the air inlet so as to diffuse incoming air to ends of the corners.

2. The air duct of claim 1, wherein the spacer is configured such that protrusions are provided on at least one of the lower surface and the upper surface to extend toward the other surface at predetermined intervals.

3. A ventilation seat for a vehicle, the ventilation seat comprising:

the air duct of claim 2, the air duct including: the upper surface provided with the plurality of air outlets; the lower surface provided with the air inlet, and configured such that the corners thereof are attached to the corners of the upper surface to form the air passage; and the spacer provided on at least one of the lower surface and the upper surface to extend toward the other surface;
a cushion part connected to the air outlets of the upper surface and an air passage of the foam pad; and
a support means supporting the lower surface.

4. The air duct of claim 1, wherein the lower surface is fastened by using a fastener to a conveying duct for conveying air from a fan, and includes a locking piece provided to intersect in a U shape with the fastener fastening the conveying duct.

5. A ventilation seat for a vehicle, the ventilation seat comprising:
the air duct of claim 4, the air duct including: the upper surface provided with the plurality of air outlets; the lower surface provided with the air inlet, and configured such that the corners thereof are attached to the corners of the upper surface to form the air passage; and the spacer provided on at least one of the lower surface and the upper surface to extend toward the other surface;
a cushion part connected to the air outlets of the upper surface and an air passage of the foam pad; and
a support means supporting the lower surface.

6. The air duct of claim 1, wherein the upper surface or the lower surface includes a wrinkle portion to be bent at a predetermined angle at a time of sitting.

7. The air duct of claim 1, wherein a nonwoven fabric is attached to a bottom of the lower surface.

8. The air duct of claim 1, wherein the upper surface is configured such that a spiral protrusion is provided on an inner side of each of the air outlets.

9. The air duct of claim 1, wherein the upper surface is configured such that a spiral cap is coupled to each of the air outlets.

10. The air duct of claim 1, wherein the air duct constituted by the upper surface and the lower surface is provided with a fan and a conveying duct at a side thereof.

11. The air duct of claim 1, wherein the upper surface or the lower surface includes a bent portion that partitions a flow direction of incoming air and guides air flow.

12. The air duct of claim 1, wherein the upper surface or the lower surface includes a first bent portion configured to be bent at a predetermined angle at a time of sitting while partitioning a flow direction of incoming air into at least one of a central portion, a left side, and a right side.

13. The air duct of claim 12, wherein the first bent portion is configured such that an end thereof is gently curved toward an air inlet side.

14. The air duct of claim 1, wherein the upper surface or the lower surface includes a second bent portion configured to be bent in a direction perpendicular to a flow direction of air flowing in the air duct.

15. The air duct of claim 14, wherein the second bent portion includes:
an upper convex portion configured such that an upper inner surface of the air duct corresponding to a seat bottom of the upper surface is convex downwardly; and
a lower convex portion configured such that an inner surface of the lower surface diagonally facing the upper convex portion is convex upwardly, wherein the upper convex portion and the lower convex portion are spaced apart from each other at a predetermined interval.

16. The air duct of claim 1, comprising:

a lower chamber of hard material configured such that the upper surface is provided with a discharge hole, the lower surface is provided with an air inlet, and the corners of the upper surface and the lower surface are attached together to form a chamber-type air passage; and an adapter of soft material provided with a plurality of air outlets connected with the discharge hole of the lower chamber to be connected to a discharge passage of a foam pad.

17. The air duct of claim 1, wherein a chamber constituted by the upper surface and the lower surface is configured such that a width thereof is gradually increased from an air inlet side toward an inside of the chamber and then is constant.

18. A ventilation seat for a vehicle, the ventilation seat comprising:

the air duct of claim 1, the air duct including: the upper surface provided with the plurality of air outlets; the lower surface provided with the air inlet, and configured such that the corners thereof are attached to the corners of the upper surface to form the air passage; and the spacer provided on at least one of the lower surface and the upper surface to extend toward the other surface;

a cushion part connected to the air outlets of the upper surface and an air passage of the foam pad; and a support means supporting the lower surface.

19. A ventilation seat for a vehicle, the ventilation seat comprising:

the air duct of claim 17, the air duct including: the upper surface provided with the plurality of air outlets; the lower surface provided with the air inlet, and configured such that the corners thereof are attached to the corners of the upper surface to form the air passage; and the spacer provided on at least one of the lower surface and the upper surface to extend toward the other surface;

a cushion part connected to the air outlets of the upper surface and an air passage of the foam pad; and a support means supporting the lower surface.

* * * * *